United States Patent
Berger et al.

(10) Patent No.: US 10,677,623 B2
(45) Date of Patent: Jun. 9, 2020

(54) MEASURING DEVICE FOR DETERMINING A FLOW AND/OR COMPOSITION OF A MEASURING MEDIUM IN A PIPE

(71) Applicant: Endress+Hauser Flowtec AG, Reinach (CH)

(72) Inventors: Andreas Berger, Erschwil (CH); Gotthard Liehr, Schopfheim (DE); Michal Bezdek, Aesch (CH); Beat Kissling, Reinach (CH); Quirin Müller, Battwil (CH)

(73) Assignee: Endress+Hauser Flowtec AG, Reinach (CH)

( * ) Notice: Subject to any disclaimer, the term of this patent is extended or adjusted under 35 U.S.C. 154(b) by 17 days.

(21) Appl. No.: 16/222,472

(22) Filed: Dec. 17, 2018

(65) Prior Publication Data

US 2019/0195670 A1      Jun. 27, 2019

(30) Foreign Application Priority Data

Dec. 21, 2017 (DE) .......................... 10 2017 107 833

(51) Int. Cl.
*G01F 1/66* (2006.01)
*G01F 15/00* (2006.01)
(Continued)

(52) U.S. Cl.
CPC .............. *G01F 1/662* (2013.01); *G01F 1/667* (2013.01); *G01F 15/00* (2013.01); *G01F 15/022* (2013.01); *G01F 15/185* (2013.01)

(58) Field of Classification Search
CPC .................................. G01F 1/66; G01F 15/00
See application file for complete search history.

(56) References Cited

U.S. PATENT DOCUMENTS 5,801,332 A * 9/1998 Berger ................. H02G 15/103
                                                                        174/73.1
6,103,975 A * 8/2000 Krabs .................. H02G 15/103
                                                                        174/74 A
(Continued)

FOREIGN PATENT DOCUMENTS

| DE | 2743394 A1 | 3/1979 |
|---|---|---|
| EP | 2035821 A1 | 1/2008 |
| WO | 2008157114 A2 | 12/2008 |

OTHER PUBLICATIONS

Search Report for German Patent Application No. 20 2017 107 833.7, German Patent Office, dated Oct. 14, 2018, 6 pp.

*Primary Examiner* — Jewel V Dowtin
(74) *Attorney, Agent, or Firm* — Christopher R. Powers; PatServe (57) ABSTRACT

A measuring device for measuring flow and/or composition of a measured medium in a pipe or tube by registering an ultrasonic measurement signal includes a measurement transmitter and a connection adapter for mechanical securement of the measurement transmitter on the pipe or tube, in which the connection adapter has a longitudinal axis and the measuring device includes a measuring transducer element and at least one metal hose, wherein at least one signal transmission cable is arranged in the metal hose for signal transmission between the measurement transmitter and a sensor element, and wherein the metal hose mechanically connects the measuring transducer element with the connection adapter.

18 Claims, 6 Drawing Sheets

(51) Int. Cl.
  *G01F 15/02*  (2006.01)
  *G01F 15/18*  (2006.01)

(56) References Cited

U.S. PATENT DOCUMENTS

| | | | | |
|---|---|---|---|---|
| 7,858,883 B2 * | 12/2010 | Seraj | ......................... | H01R 4/72 |
| | | | | 174/88 R |
| 7,863,521 B2 * | 1/2011 | Campbell | .......... | H02G 15/1826 |
| | | | | 174/93 |
| 8,030,570 B2 * | 10/2011 | Seraj | .................. | H02G 15/1833 |
| | | | | 174/88 C |
| 8,889,989 B2 * | 11/2014 | Maher | ................... | H02G 15/064 |
| | | | | 174/77 R |
| 2011/0162460 A1 | 7/2011 | Allen et al. | | |
| 2017/0205260 A1 | 7/2017 | Jaaskelainen et al. | | |

* cited by examiner

MEASURING DEVICE FOR DETERMINING A FLOW AND/OR COMPOSITION OF A MEASURING MEDIUM IN A PIPE

CROSS-REFERENCE TO RELATED APPLICATION

The present application is related to and claims the priority benefit of German Patent Application No. 10 2017 107 833.7, filed on Dec. 21, 2017, the entire contents of which are incorporated herein by reference.

TECHNICAL FIELD

The present invention relates to a measuring device as defined in the preamble of claim 1.

BACKGROUND

Typically in ultrasonic flow measuring devices, signal cables are unprotected, or led with only usual insulating material between the one or more ultrasonic sensors and the measurement transmitter.

This can lead to damage of the signal cable during operation of the measuring device, e.g. from animal nibbling, UV-radiation or mechanical action. Also, temperature influences in the case of contact of a cold or hot measuring tube by the signal cable, e.g. in the case of high temperature measurements or the measuring of cryogenic liquids, can affect the transmission of the measurement signal.

Enclosure of the signal cable in a housing makes it difficult to exchange ultrasonic sensors and besides is difficult to implement.

SUMMARY

An object of the present invention is to increase the protection of signal cables extending between measuring transducer elements and the transmitter of the measuring device while providing for simple exchangeability.

The invention solves the object by a measuring device as defined in claim 1.

A measuring device of the invention for measuring flow and/or composition of a measured medium in a pipe or tube by registering an ultrasonic measurement signal comprises a measurement transmitter and a connection adapter for mechanical securement of the measurement transmitter on the pipe or tube. The connection adapter has a longitudinal axis, which extends between an interface of the connection adapter with the pipe or tube and an interface between the connection adapter and the measuring transducer.

The measuring device includes a measuring transducer element, preferably at least two measuring transducer elements. A measuring transducer element can be just a holding apparatus for a sensor element, especially an ultrasonic sensor element. Alternatively and preferably, a measuring transducer element can also be only the sensor element, for example, a signal producing and/or a signal receiving, ultrasonic, sensor element. A measuring transducer element can preferably also be a combination of the holding apparatus and the sensor element.

Furthermore, the measuring device includes at least one metal hose, especially an armored hose. Preferably, a metal hose is associated with each measuring transducer element.

Arranged in the metal hose is at least a first signal transmission cable for signal transmission between the measurement transmitter and the measuring transducer element, preferably the sensor element, especially the ultrasonic, sensor element.

The metal hose mechanically connects the measuring transducer element with the connection adapter and assures a shielding e.g. against electromagnetic radiation and/or electrical short circuiting between a sensor thimble and the measurement transmitter.

The metal hose is preferably embodied as an armored hose.

The metal hose also provides reliable protection of the signal cable against mechanical damage and enables supplementally protection against electromagnetic radiation, for example, by connection of the metal hose to ground.

Other advantageous embodiments of the invention are subject matter of the dependent claims.

The armored hose can extend radially, especially perpendicularly, to the longitudinal axis of the connection adapter from an outer wall of the connection adapter.

The measuring device can especially advantageously have at least two armored hoses arranged on the connection adapter.

The connection adapter can, additionally, have a hollow space, in which a temperature sensor of the measuring device can be arranged in the region of an interface of the connection adapter with the pipe or tube, in order to save space and be protected against mechanical influences. A second signal transmission cable connects the temperature sensor with the transmitter.

The one or more first signal transmission cables are led from the measuring transducer element through the metal hose and within the connection adapter to the measurement transmitter, whereby a safe protection of the signal cable throughout the total signal transmission path is assured. Advantageously, already existing components are utilized for protection.

The one or more metal hoses are releasably secured to the connection adapter and are, thus, exchangeable without complication in the case of damage.

The connection adapter includes at least four interfaces for connecting armored hoses, wherein at least two of the interfaces extend in parallel with one another. The parallel extension has, for instance, advantages for manufacturing.

Each of the measuring transducer elements includes a sensor thimble, wherein the sensor thimble has a thimble floor and a lateral surface and wherein the sensor thimble has laterally and externally a connection nozzle for connection with a metal hose. Because of the rotatable arrangement of the measuring transducer elements, and of the sensor thimble, relative to the measuring tube, a low stress arrangement of the metal hoses is achieved, which can, indeed, be flexible, but nevertheless can exert a tensile- or compressive load on their connection locations.

An arrangement of a measuring transducer element in a seat on a pipe or tube before the ultimate securement of the sensor element is disclosed, for example, in DE 27 43 394 A1, in which, firstly, a stress free arrangement of a sensor element in a seat on the tube occurs and then a tightening of the measuring transducer element in the seat follows. According to the concept of the present of invention, the sensor thimble with the sensor element is rotatably seated in the case of its arrangement on a pipe or tube, especially in a seat on a measuring tube, and only in the tightened state finally secured rotation freely, or with higher mechanical resistance on the pipe or tube, especially in the seat.

The rotatable arrangement of the measuring transducer elements, especially the sensor thimble, in the non-tightened state reduces the hose length variations of the utilized metal hoses, wherein the measuring transducer elements, depending on tensile- or compressive loading by the metal hoses, are orientable ideally tension relievingly on the measuring tube.

Ideally, the sensor thimble can, in such case, have in the transition between the metal hose and the ultrasonic sensor element in the region of the floor of the sensor thimble a hollow space as a connection space for the sensor cable.

The pipe or tube, on which the connection element is placed, is preferably a measuring tube associated with the measuring device.

The measuring tube includes on its measuring tube outer wall seats for the introduction of the measuring transducer elements and for their securement on the measuring tube in a tightened state, wherein the sensor thimble is secured on the measuring tube in an untightened, relaxed state rotatably around its longitudinal axis.

The metal hose, especially the armored hose, can on a measuring transducer facing end and/or a connection adapter facing end be plugged onto nozzle like formations and be held on the formations by means of first metal clamp- or detent elements, wherein neighboring a first metal clamp- or detent element is a second clamp- or detent element for grounding the metal hose. Because of these uncomplicated securement variants, the disadvantages, which can occur in the case of application of a metal hose, are advantageously prevented. At the same time, a safe holding of the metal hose to the nozzle shaped formation, e.g. a hose nipple, is enabled.

The measuring transducer elements can be mounted accessibly and releasably externally on the pipe or tube, especially on the measuring tube. Such a variant of the mounting of the measuring transducer elements enables simple removal and maintenance of the sensor elements, especially ultrasonic, sensor elements.

The sensor thimble has a grooved surface, preferably a fluting, along a support surface against the pipe or tube, especially the measuring tube. In this way, a pressure buildup can be controllably released. If the seal (e.g. an O-ring) between the sensor element and the seat on the measuring tube fails, it is then avoided that the process pressure (e.g. 100 bar) gets into the space occupied by the signal cables, or into the sensor thimble. The pressure is released through the fluting. Additionally, the grooves, or fluting, enable a twist resisting mounting of the sensor thimble on the measuring tube in the case of tightened securement of the sensor element on the measuring tube.

The connection nozzle of the sensor thimble can, for especially advantageous strain relieving arrangement of the metal hose and the measuring transducer element, have an angle from the lateral surface, which corresponds to the angle, which the longitudinal axis of the sensor thimble has relative to the tube axis of the tube, especially the measuring tube.

Within the hollow space of the connection adapter, additionally, a cable protection tube can be arranged, wherein the first and second signal transmission cables are led in the protection tube. The cable protection tube can, additionally, be arranged advantageously telescopically axially movably relative to an outer wall of the connection adapter. Alternatively, the outer wall of the connection adapter can be arranged axially movably relative to the cable protection tube.

The interface between the connection adapter and the metal hose can be a component connected with the connection adapter and having a nozzle like form.

BRIEF DESCRIPTION OF THE DRAWING

The invention will now be explained in greater detail based on examples of embodiments and with the help of the figures of the appended drawing. The examples of embodiments are purely by way of example and not limiting. Individual features of the embodiments are per se advantageous and transferable to a number of other features of embodiments. The figures of the drawing show as follows.

DETAILED DESCRIPTION

Figure 1:
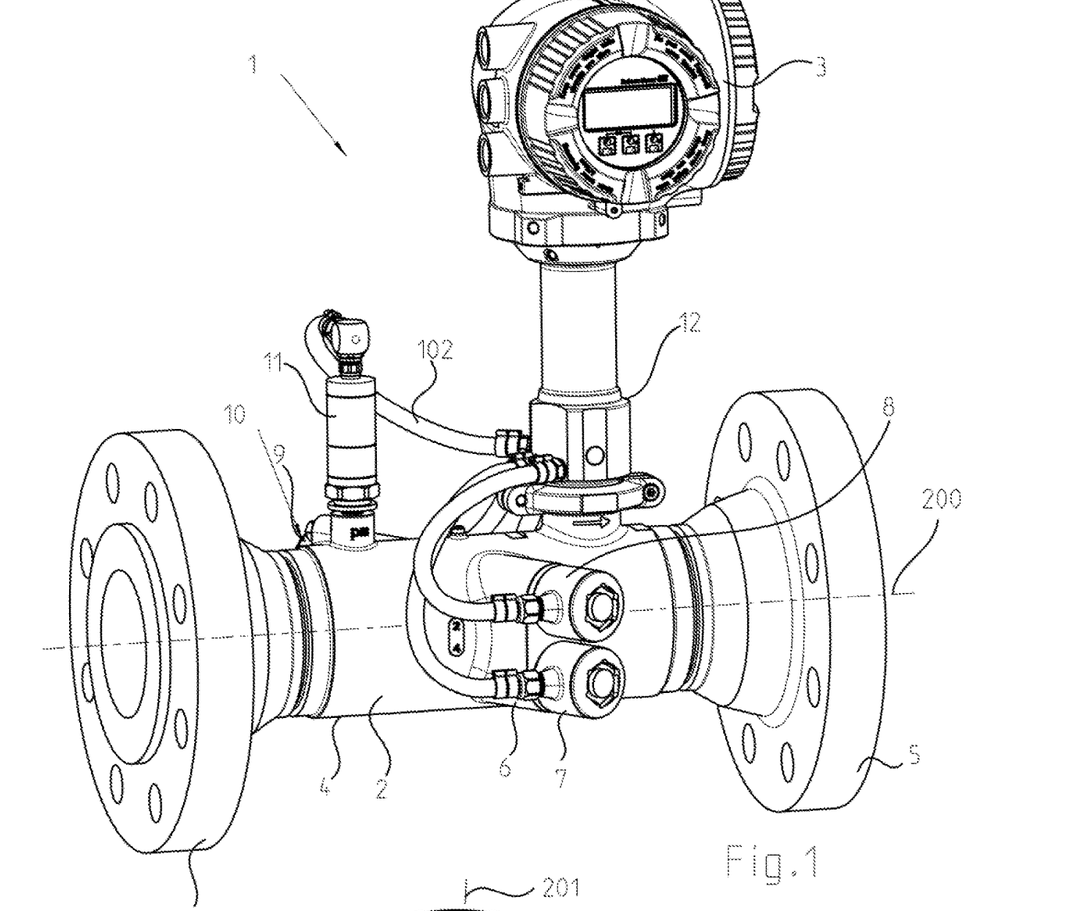
FIG. 1 shows a perspective view of a measuring device of the invention.

FIG. 1 shows a measuring device 1 for measuring flow and/or composition of a measured medium in a measuring tube 2 utilizing an ultrasonic measurement signal.

Measuring device 1 can preferably be embodied as an ultrasonic, flow measuring device, which measures flow of a medium by application of the known travel time difference method.

Alternatively or supplementally, also only a determining and/or quantifying of the individual components of a medium with a number of components, e.g. a gas mixture, can be performed. Quantifying individual components of a gas mixture based on ultrasonic measuring is treated, for example, in EP 2035821 A1.

Measuring device 1 can be embodied as an ultrasonic, flow measuring device, especially as a so-called clamp-on flow measuring device or, especially preferably, as a flow measuring device having a measuring tube as part of the flow measuring device.

FIG. 1 shows a first embodiment of a measuring device 1 of the invention. It includes a measuring transducer 2 and a measurement transmitter 3.

In the following example of an embodiment, the measuring transducer 2 includes a measuring tube 4, which is insertable into a fluid conveying line of a plant and through which a measured medium can be led, wherein the measuring device determines the flow and/or the composition of the measured medium.

The measuring tube 4 includes terminal flanges 5 for connecting the measuring device 1 to a medium conveying line, as well as at least two or more connection nozzles 6 for mounting measuring transducer elements 7-11 on the measuring tube 4. The measuring tube has a longitudinal axis 200. The measuring transducer elements 7-11 are especially embodied as sensor thimbles, preferably of cylindrical shape, and having terminal lids 29.

Figure 4:
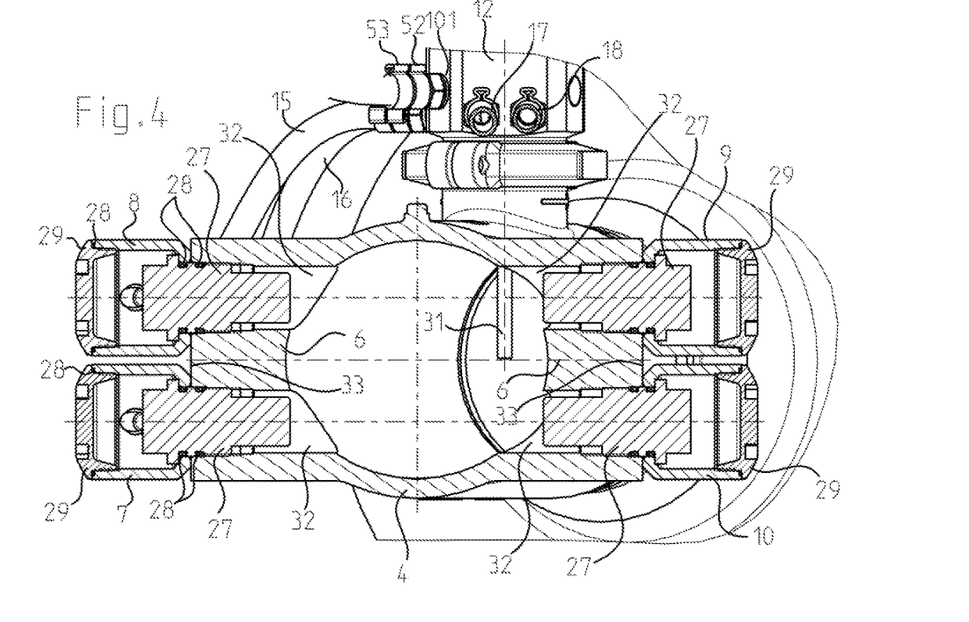
FIG. 4 shows a sectional view of a measuring tube of a second measuring device of the invention perpendicular to its longitudinal axis.

An ultrasonic, measurement signal produced by means of the measuring transducer elements 7, 8, 9 or 10 can be led in different ways through the measuring tube 4. Thus, the ultrasonic, measuring transducer elements 7-10 can be arranged in different ways on the measuring tube 4 for transmission and/or receipt of an ultrasonic signal. Shown in FIG. 4 is that the ultrasonic, measuring transducer elements 7,8 and 9,10 are arranged in pairs extending parallel and next to one another in a cross section through the longitudinal axis 200 of the measuring tube 4 and connected preferably at least by force interlocking, e.g. frictional interlocking, and/or by shape interlocking, with the connection nozzles 6.

The ultrasonic, measuring transducer elements 7-10 are arranged pairwise on oppositely lying sides of the measuring tube 4, so that at least one ultrasonic signal can be led through the measuring tube 4.

Connected between the measuring transducer 2 and the measurement transmitter 3 is a connection adapter 12 for connection of the measurement transmitter with the measuring tube 4, or, in the case of a clamp-on variant, for connection with a pipeline. On the measurement transmitter end, the connection adapter has a first interface 13, here in the form of a thread, and on the measuring tube end a second interface 14, here in the form of an interface for securement on the measuring transducer provided by means of a bracket generally known in the industry.

The connection adapter 12, often also called sensor neck, can, among other things, also serve for thermal decoupling of the measurement transmitter from the measuring tube 4.

Arranged on the measuring tube 4 in the embodiment of FIG. 1 is, additionally, a pressure sensor as a further measuring transducer element 11.

The construction of the total assembly of connection adapter and measuring transducer elements 7-10 is explained in greater detail with reference to FIG. 3. The measuring transducer elements 7-10 include in their embodiment in FIG. 3 sensor thimbles 20 for seating ultrasonic, sensor elements (not shown in FIG. 3).

Figure 2:
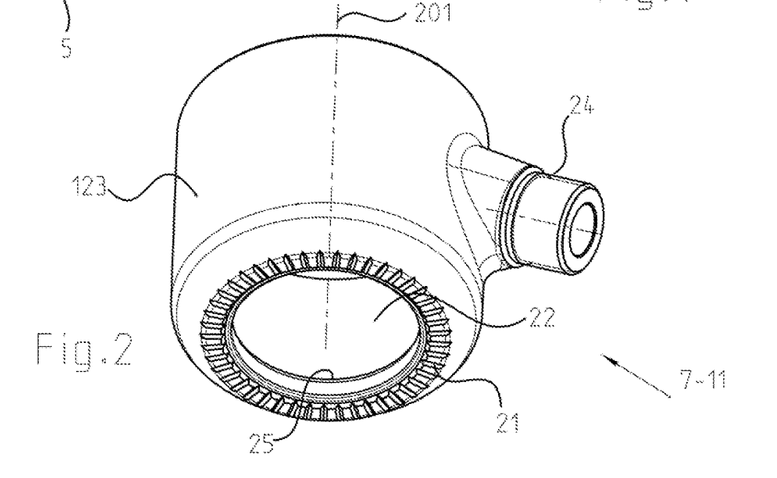
FIG. 2 shows a perspective view of an embodiment of a measuring transducer element of the measuring device of the invention.

An individual measuring transducer element in the form of a sensor thimble 20 is shown in detail in FIG. 2. Sensor thimble 20 includes a lateral surface 123. Such can preferably be embodied cylindrically, however, also other forms, such as e.g. truncated cones- or prismatic forms with corresponding lateral surfaces provide other options. Furthermore, the sensor thimble 20 includes a thimble floor 25.

Thimble floor 25 and lateral surface 123 define a hollow space 22, in which an ultrasonic, sensor element is partially arrangeable. Hollow space 22 includes an opening, through which an ultrasonic, sensor element partially protrudes. The edge of this opening defines the connection end of the sensor thimble to a pipe or tube, especially on the mounting nozzles 6 of the measuring tube 4. The edge of the opening of the hole 22 has a fluting 21.

Fluting 21 serves, in the case of sudden occurrence of a pressure rise, to reduce the pressure, e.g. by lateral edge medium escape through the fluting. Thus, the fluting serves for pressure reduction and forms an additional safety measure for protecting the measurement transmitter 3 and the connection space lying thereunder in the connection adapter 12.

Sensor thimble 20 additionally includes a connection nozzle 24, which radially protrudes from the lateral surface 123.

Connection nozzle 24 of the sensor thimble is, in such case, preferably tilted, i.e. it extends from the lateral surface 123 at an angle other than 90°. The angle should ideally, compared with the lateral surface, or compared with the longitudinal axis of the sensor thimble 20, be selectable, so that the connection nozzle 24 of the sensor thimble can, depending on tension force, orient ideally tension relievingly in the case of the arrangement with free rotation around the longitudinal axis of the sensor thimble on a connection nozzle 6 of the measuring tube 4.

It has been been found surprisingly that the angle for an optimal strain relieving arrangement corresponds to the angle, which the longitudinal axis of the sensor thimble 20 assumes relative to the longitudinal axis 200 of the measuring tube. Arranged between each of the measuring transducer elements 7-11 and the connection adapter 12 is, in each case, at least one metal hose 15-18, 102, a so-called armored hose.

Arranged in the metal hoses are signal- and/or energy transmitting cables for electrical current supply and/or energy supply of the ultrasonic, measuring transducer elements and/or the pressure sensor.

The armored hoses, serve, among other things, for protecting the aforementioned cables from externally acting mechanical and electromagnetic influences. FIG. 3 shows only one connection 101 for the metal hose 102 of the pressure sensor 11 to the connection adapter 12.

Figure 9:
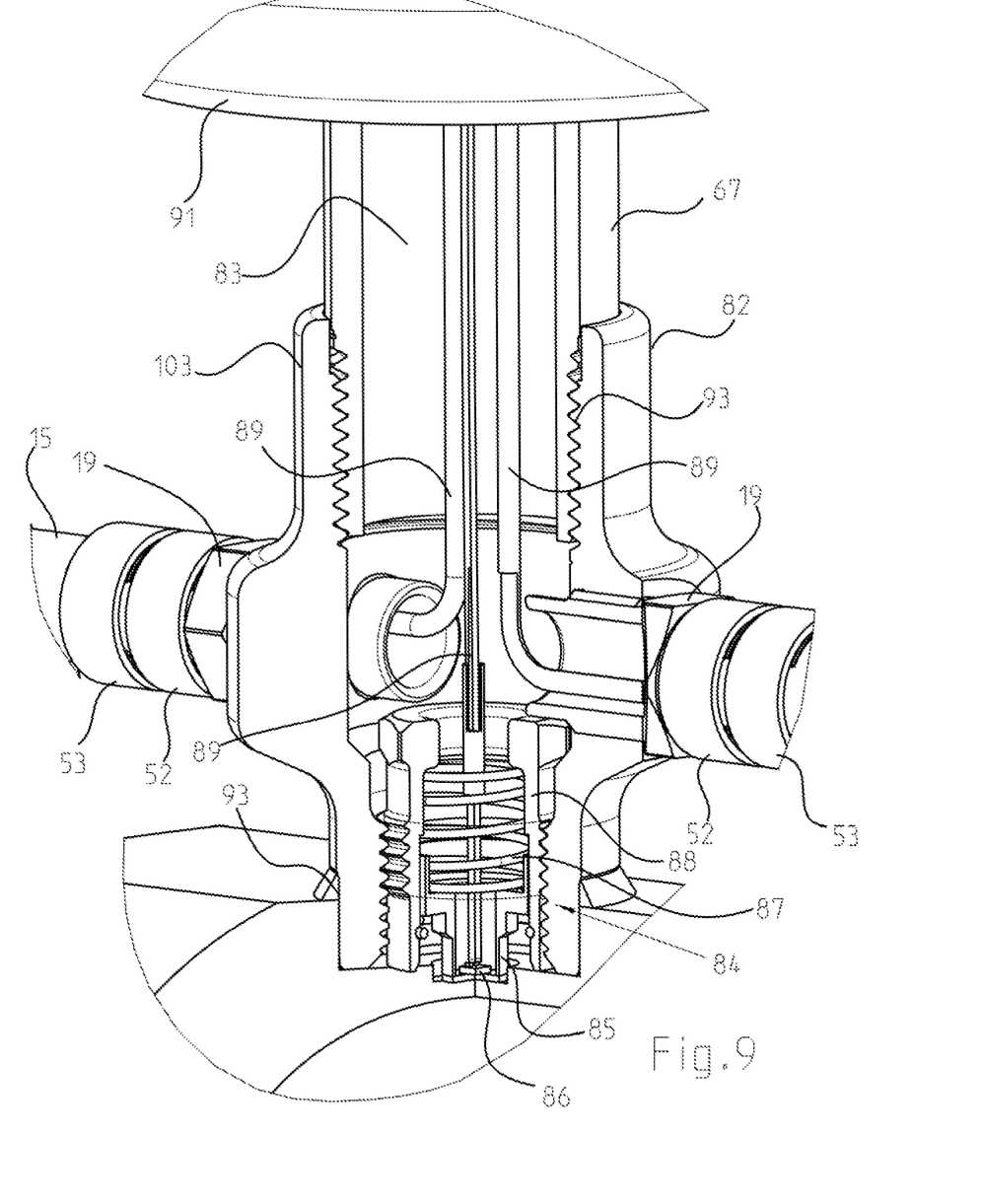
FIG. 9 shows a sectional view of a connection adapter of a seventh measuring device of the invention.

FIG. 9 represents a modified variant of connection adapter, connection adapter 82, which has a slightly modified shape. Connection adapter 82 has elements constructed essentially equally to those of connection adapter 12, wherein the connector regions and the internal construction of a preferred embodiment of a preferred connection adapter will now be explained in greater detail based on FIG. 3.

Apart from different external contours of the connection adapters 12 and 82, the essential, structural properties of the connection adapter 82 can be transferred to the connection adapter 12.

Figure 3:
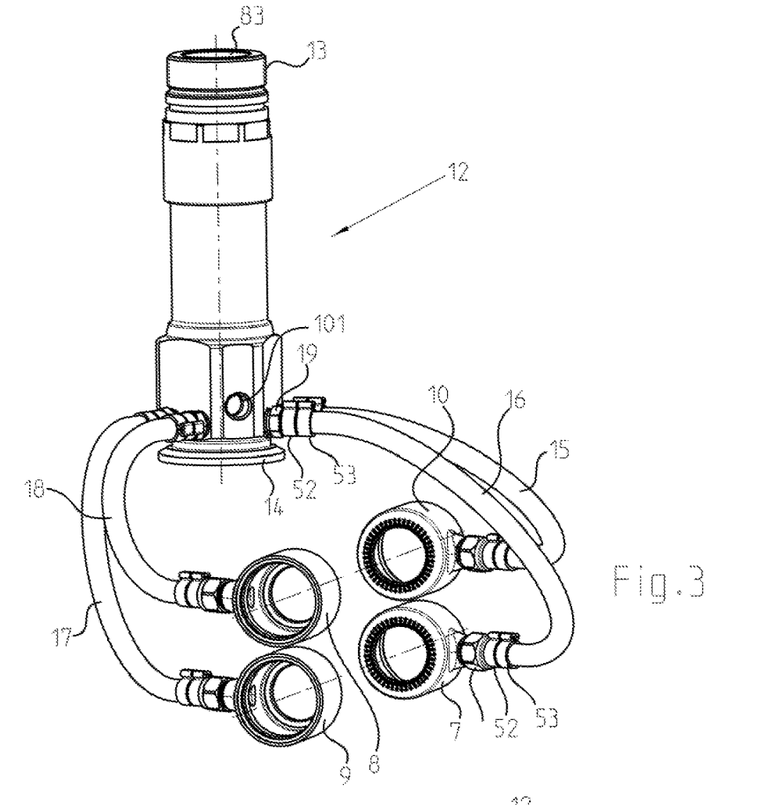
FIG. 3 shows a perspective view of a variant of a connection adapter, connected metal hoses and connected measuring transducer elements of the measuring device of the invention.

All additional features illustrated in FIG. 9 for the connection adapter illustrated in FIG. 3 are, thus, also transferable to the connection adapter 12.

Connection adapter 82 includes a hollow space 83, which extends between a measurement transmitter 91 of an embodiment and a measuring device 81 of the invention, down to a pipe or tube, especially a measuring tube 90 of the measuring device 81. Connection adapter 82 includes an interface 92 to the housing segment 69a. In the present example of an embodiment, interface 92 can be formed by a weld seam.

An interface 93 to the measuring tube 90 can be embodied in analogous manner as a weld seam.

Connection adapter 82 has a longitudinal axis. Arranged perpendicularly, or inclined, to this longitudinal axis in the lateral surface 103 of the connection adapter 82 are hose nipples 19 for connecting the metal hoses 15-18, 102. Hose nipple 19 can be secured in the lateral surface 103 of the connection adapter 82 by welding and/or screwing or some other appropriate technique.

The hose nipples 19 FIG. 9 have a hexagonal outer contour for the engagement of a tool.

Figure 10:
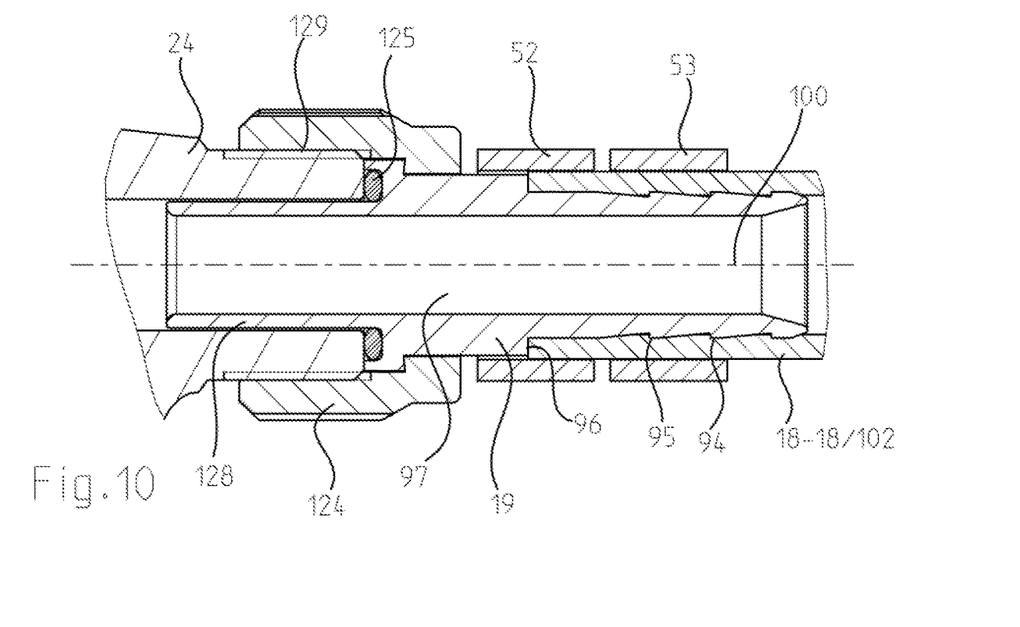
FIG. 10 shows a connection between metal hoses and a connection adapter of a measuring device of the invention.

Hose nipples 19 are embodied sleeve shaped and one is shown in detail in FIG. 10. The hollow space 97 of the sleeve-shaped hose nipple 19 is open on both ends and serves to accommodate energy- and/or signal transmission cable passing through. Hose nipple 19 has a longitudinal axis and a Christmas tree like outer contour with radially extending projections 95.

Analogously, each of the metal hoses 15-18, 102 can have terminally an inner contour with radially inwardly extending projections 94 for connecting to a hose nipple 19. Alternatively, the hoses can also be embodied internally smoothly and be made to shape interlock with the projections 95 during the mounting, e.g. by pressing. Each metal hose 15-18, 102 can be secured on a hose nipple 19 using clamp- or detent elements 52, 53. FIG. 10 shows encircling clamp- or detent elements 52, 53, preferably in the form of screw clamps, which have screws for tightening the clamps.

At least a first of the two clamp- or detent elements 52, 53 is made of a conductive material, preferably metal, and contacts the hose nipple 19 with the metal hose 15-18, 102, in order to enable an electrical grounding of the metal hose 15-18, 102.

The second clamp- or detent element 53 can be embodied same as the first clamp- or detent element and enables especially the mechanical securement of the metal hose 15-18, 102 on the hose nipple 19.

For limiting the pushing on of the metal hose 15-18, 102, the hose nipple 19 includes a stop 96.

The connection of the metal hoses 15-18, 102 on the hose nipples of the sensor thimbles 20 can occur analogously as in the case of the connection of the metal hoses 15-18, 102 to the hose nipples 19 of the connection adapter 82. Coupling nuts 124 screw hose nipples 19 to the connection nozzles 24 of the measuring transducer elements 7-11/23 with the interpositioning of axially sealing O-ring 125, and the metal hoses 15-18, 102 are held on the hose nipples 19 by means of two clamp- and/or detent elements 52,53, especially in the form of metal screw clamps. Closure lids 127 serve for terminal closure of the sensor thimbles 20. Further provided on the hose nipples are pre-centering extensions 128. Longitudinal axis sensor thimble. Also in this case, a coupling nut 124 is provided. The aforementioned connection is especially shown in FIG. 11.

With reference to FIG. 9, the connection adapter 82 includes a temperature sensor 84 within the hollow space 83 in the region of an interface 93 with the measuring tube 90. Temperature sensor 84 is connected for signal exchange with the measurement transmitter 91 via cables 89 extending in the hollow space 83. Temperature sensor 84 includes a temperature sensor element 86, e.g. a PT-100 or PT-1000 sensor, arranged terminally on the temperature sensor 84. This is arranged in a piston 85, which is arranged spring biased and axially shiftably relative to a cylindrical annular seat 88. The bias is achieved by a spring 87, which is connected between the annular seat 88 and the piston 85 and which, in the case of axial movement of the piston 85, extends or compresses relative to the annular seat 88.

The annular seat 88 is formed as an inner contour of the connection adapter 82. The arrangement of ultrasonic, sensor elements on a measuring tube 4 is known per se but will be briefly explained based on FIG. 4.

The ultrasonic, sensor elements 26/27 can typically have an ultrasound producer, e.g. a piezoelement, and, in given cases, an arrangement of one or more materials for matching. A first ultrasonic signal enters in FIG. 4 through an ultrasound window of the ultrasonic, sensor element 27 into the measuring tube and produces together with the oppositely lying ultrasonic, sensor element 27 a signal path. Arranged in parallel with the first ultrasonic, sensor elements 27 is a second ultrasonic, sensor element pair 26/26 for producing an additional, second signal path extending in parallel with the aforementioned signal path. The seat 6 has seat openings 32, into which the ultrasonic, sensor elements 26, 27 are typically screwed in or insertable and affixable by friction and/or engagement.

The ultrasonic, sensor elements have lateral sealing elements 28, e.g. sealing rings, for sealing in the seat 6. The sensor thimbles 10 have no direct connection with the seats 6, but, instead, are connected with the seat 6 via their sensor elements 26, 27. The sensor thimbles 10 have, additionally, longitudinal axes 201.

It is apparent that the fluting 21 lies in FIG. 4 on edge surfaces neighboring the seat openings 32.

Figure 11:
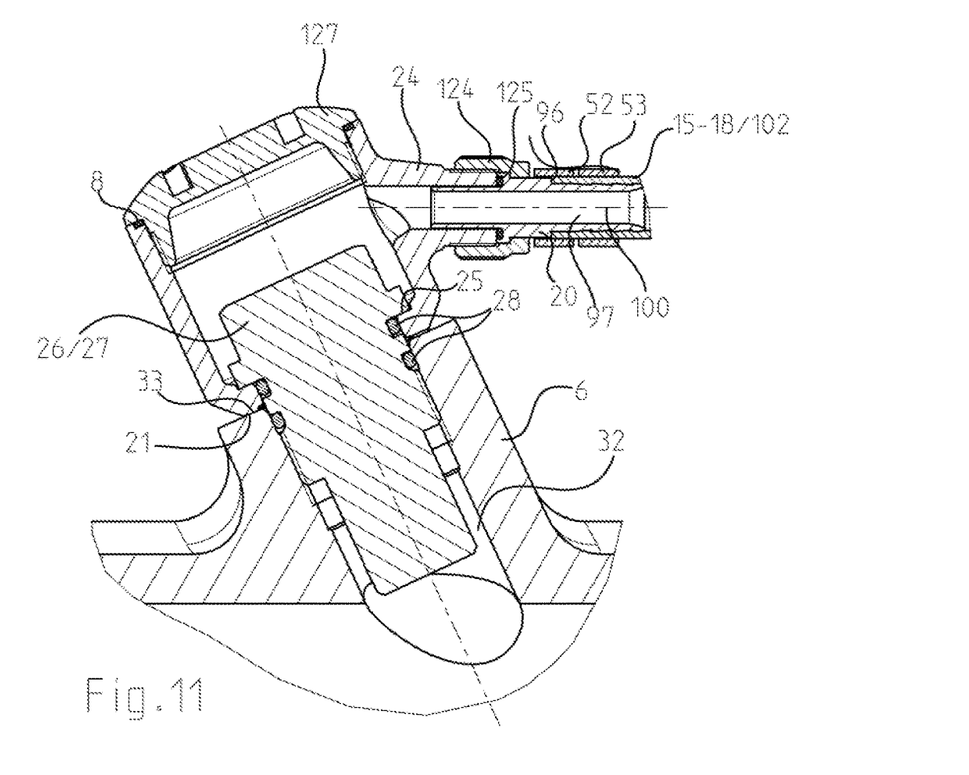
FIG. 11 shows a further detail view of a connection between metal hoses and a connection adapter of a measuring device of the invention.

Shown in FIG. 4 and especially in FIG. 11 is a hose nipple 19 connected with the connection nozzle 24, wherein there is plugged onto this hose nipple 19 one of the metal hoses 15-18, which leads to the preferably equally embodied hose nipple 19 of the connection adapter 12. The metal hoses 15-18 for the ultrasonic, measuring transducer elements 7-10 and the metal hose 102 for the pressure sensor 11 can be seen in FIG. 4 having, in each case, two metal screw clamps 52, 53 connected on the hose nipples 19 of the connection adapter 12.

Protruding regionally into the measuring tube 4 in FIG. 4 along an extension of the longitudinal axis of the connection adapter 12 is a temperature sensor 31, which, in contrast to FIG. 9, is not arranged completely out of the lumen of the measuring tube, but, instead, extends inwardly into the lumen of the measuring tube.

The invention, is not limited to the preferred embodiments illustrated in FIGS. 1 to 4, 9 and 10, but, instead, enables a large number of additional preferred embodiments, of which some are shown in FIGS. 5 to 8.

Figure 5:
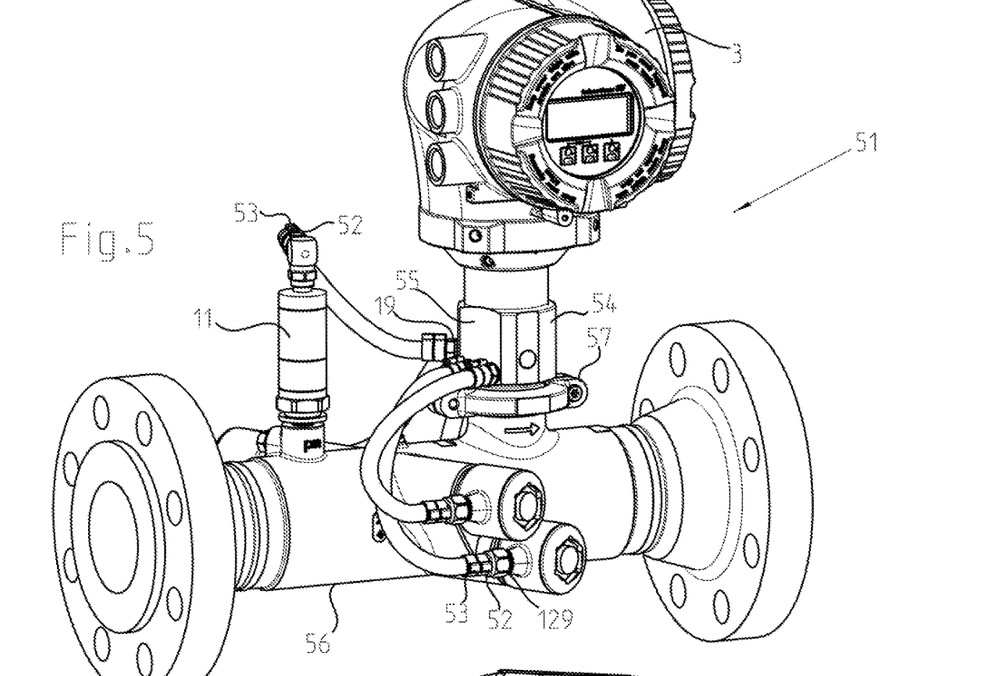
FIG. 5 shows a perspective view of a third measuring device of the invention.
Figure 6:
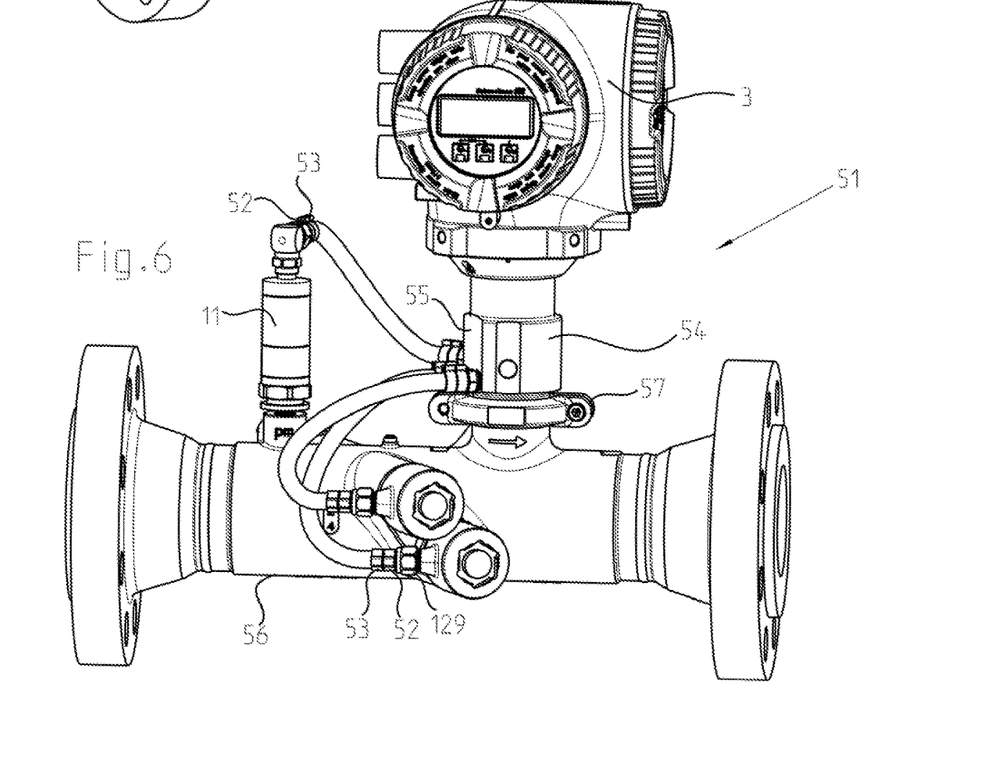
FIG. 6 shows a perspective view of a fourth measuring device of the invention.

FIG. 5 shows a measuring device 51 having a connection adapter 54 slightly modified compared to that of the measuring device 1. In such case, the connection adapter 54 has relative to the diameter of the measuring tube 56 a significantly greater longitudinal axis than in FIGS. 1 to 4. Additionally, the connection ends 55 of the pairwise arranged hose nipples 19 are not diametrally opposite on the connection adapter 54, but, instead, are arranged pairwise at angles relative to one another. On the hose nipple 19 of the pressure sensor 11 and, also, on the hose nipples 19 of the ultrasonic, measuring transducer elements, the metal hoses are, in each case, secured with two metal screw clamps 52, 53. The connection adapter 54 is connected with the measuring tube 56 by a flange connection with a shell arrangement 57 composed of at least two half shells gripping around the flange segments. The seats of the ultrasonic, sensor elements are likewise arranged at another angle to the longitudinal axis of the measuring tube 56 than in the case of FIGS. 1 to 3.

Figure 7:
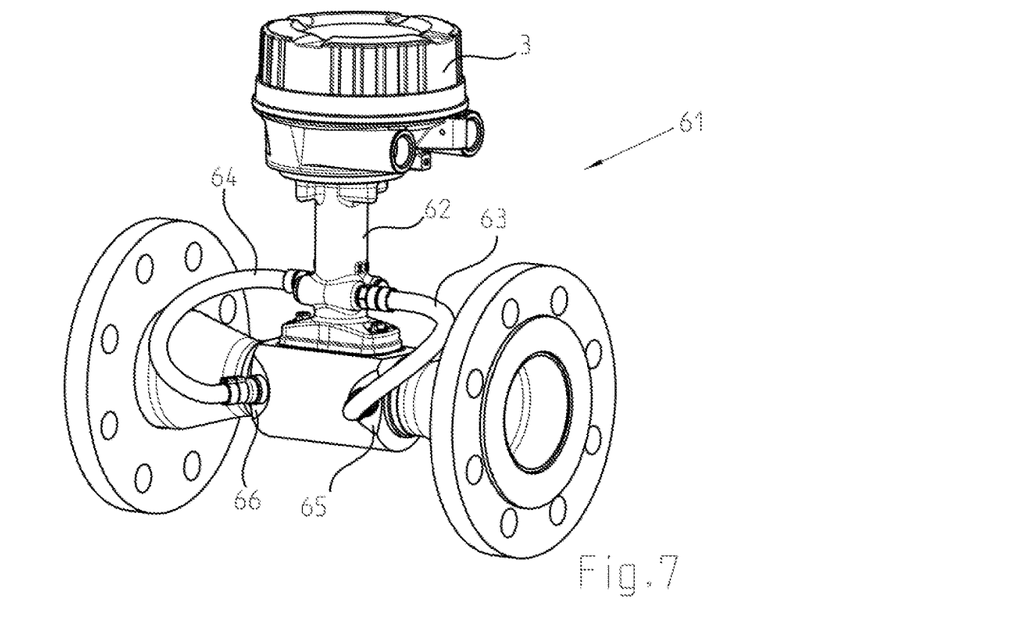
FIG. 7 shows a perspective view of a fifth measuring device of the invention.
Figure 8:
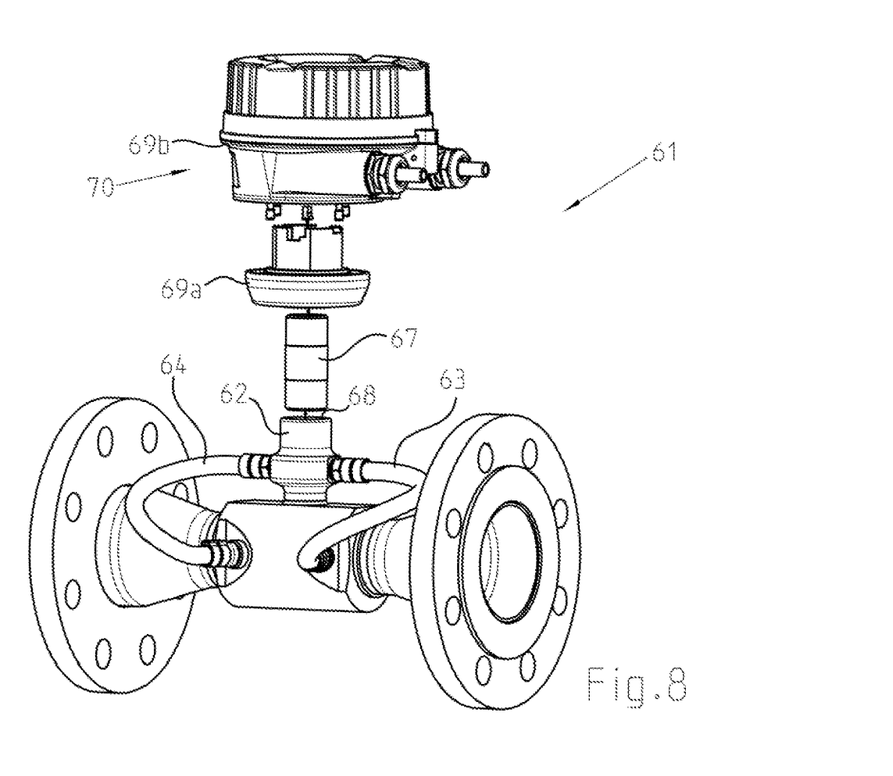
FIG. 8 shows an exploded view of a sixth measuring device of the invention.

In the variants of a measuring device 61 of the invention in FIGS. 7 and 8, no sensor thimbles with lateral connection nozzles 12 are provided. In these variants the measuring transducer elements comprise only ultrasonic, sensor elements with hose nipples arranged thereon. There are in the variants of FIGS. 7 and 8 only two measuring transducer elements provided with, correspondingly, two metal hoses 63 and 64 connected thereto for connection with a connection adapter 62, which is arranged between a measuring tube and the measurement transmitter 70. In this embodiment, only two metal hoses are provided. The connection ends 65, 66 of the measuring transducer elements are arranged on the measuring tube symmetrically about a plane perpendicular to the longitudinal axis of the measuring tube.

The measurement transmitter 70 can comprise a plurality of housing segments 69a and 69b. Within a cylindrical wall 68 of the connection adapter 62, an additional cable protecting sleeve 67 is installed, which is axially screwable, relative to the cylindrical wall 68, so that the length of the connection adapter 62 is easily variable to provide a longer variant of the connection adapter 62 and, thus, one adaptable to a certain temperature of the measured media, e.g. to temperatures greater than 200° C. or to temperatures less than −40° C. in the case of cryogenic media, for thermal decoupling of the measurement transmitter 70. On the oppositely lying side of the cable protecting sleeve 67, the housing segment 69a is likewise screwed on. In another form of embodiment, the parts of the connection adapter 62, cable protecting sleeve 67 and housing segment 69a, can also be welded to one another.

The invention claimed is:

1. A measuring device for measuring flow and/or composition of a measured medium in a pipe or tube by registering an ultrasonic, measurement signal, the measuring device comprising:
    a measurement transmitter;
    a measuring transducer element;
    at least one signal transmission cable adapted to transmit a signal between the measuring transducer element and the measurement transmitter;
    at least one metal hose; and
    a connection adapter having a longitudinal axis and configured to mechanically secure the measurement transmitter on the pipe or tube,
    wherein the at least one signal transmission cable is disposed in the at least one metal hose, and wherein the at least one metal hose mechanically connects the measuring transducer element with the connection adapter.

2. The measuring device of claim 1, wherein the at least one metal hose extends radially relative to the longitudinal axis of the connection adapter from an outer wall of the connection adapter.

3. The measuring device of claim 1, wherein the measuring device has at least two metal hoses arranged on the connection adapter.

4. The measuring device of claim 1, wherein the at least one metal hose connects the measuring transducer element with the connection adapter using hose nipples.

5. The measuring device of claim 1, further comprising a temperature sensor, wherein the connection adapter includes a hollow space, and wherein the temperature sensor is disposed in an interface region between the connection adapter and the pipe or tube and is connected with the measurement transmitter by a second signal transmission cable.

6. The measuring device of claim 1, wherein a first signal transmission cable is routed within the connection adapter to the measurement transmitter.

7. The measuring device of claim 1, wherein the at least one metal hose is releasably secured to the connection adapter.

8. The measuring device of claim 1, wherein the connection adapter has at least two interfaces for connecting at least two metal hoses, wherein the at least two of the interfaces extend in parallel with one another.

9. The measuring device of claim 8, wherein the connection adapter has at least four such interfaces.

10. The measuring device of claim 1, wherein the measuring transducer element includes a sensor element, wherein the measuring transducer element has a thimble floor and a lateral surface, and wherein the measuring transducer element has laterally and externally a connection nozzle configured for connection with the at least one metal hose.

11. The measuring device of claim 10, wherein the connection nozzle of the measuring transducer element forms an angle relative to the lateral surface, which corresponds to an angle that a longitudinal axis of the measuring transducer element has relative to an axis of the pipe or tube.

12. The measuring device of claim 1, wherein the pipe or tube is a measuring tube associated with the measuring device.

13. The measuring device of claim 1, wherein the measuring tube includes at least one seat on an outer wall thereof configured to enable the introduction of a sensor element into the measuring tube and to facilitate securing the sensor element on the measuring tube in a tightened state, wherein the measuring transducer element is secured on the measuring tube in an untightened state rotatably about a longitudinal axis of the measuring transducer element.

14. The measuring device of claim 1, wherein the at least one metal hose is, on an end adjacent the measuring transducer element and/or on an end adjacent the connection adapter, introduced onto nozzle-like formations on a hose nipple of the measuring transducer element and/or the connection adapter and secured on the hose nipple using an electrically conductive first metal clamp or detent element, wherein adjacent the first metal clamp or detent element is an electrically conductive second clamp or detent element configured and positioned to enable electrical grounding of the at least one metal hose.

15. The measuring device of claim 1, wherein the measuring transducer element includes a sensor element mounted releasably externally on the pipe or tube.

16. The measuring device of claim 1, wherein the measuring transducer element has a grooved surface along a support surface for contacting the pipe or tube.

17. The measuring device of claim 1, wherein the least one signal transmission cable is routed within a hollow space of the connection adapter through a cable protection tube within the connection adapter.

18. The measuring device of claim 1, wherein an interface between the connection adapter and the at least one metal hose is a hose nipple connected to the connection adapter and having the nozzle-like formation.

* * * * *